May 27, 1941.    C. W. VAUGHAN    2,243,137
COOKER FOR PREPARING WIENER SANDWICHES
Filed Nov. 12, 1940
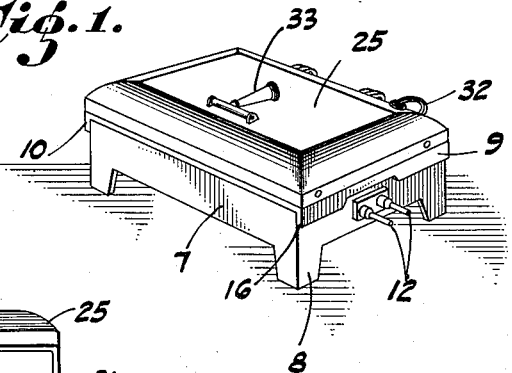
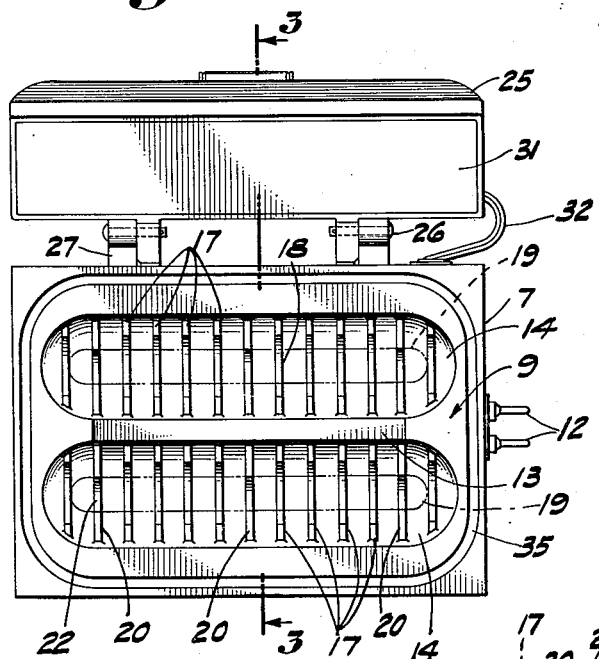
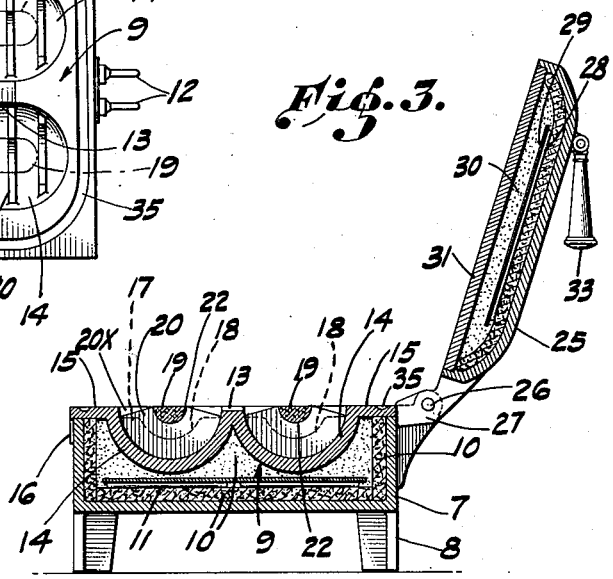
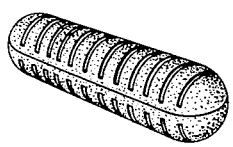
CLYDE W. VAUGHAN,
INVENTOR.
BY
ATTORNEY.

Patented May 27, 1941

2,243,137

UNITED STATES PATENT OFFICE 2,243,137

COOKER FOR PREPARING WIENER SANDWICHES

Clyde W. Vaughan, Los Angeles, Calif.

Application November 12, 1940, Serial No. 365,290

4 Claims. (Cl. 107—66)

This invention relates to a cooker for preparing a combined meat and cereal edible.

Speaking more specifically of the kind of edible produced by said cooker, it consists of a core portion which is formed of a meat that has been previously cooked, usually in the form of what is known as a wiener or sausage and then, by the means provided by the invention, is additionally cooked or seared and at the same time is embedded within a cereal dough which is likewise baked in the cooker provided by the invention.

While it is not broadly new to embed a cooked meat core within a jacket of a cooked cereal substance, yet, by this invention, a means is provided for more quickly and satisfactorily combining the meat part of the edible with the cereal portion thereof and for more thoroughly heating the meat core while the cereal jacket is being cooked therearound.

Among the objects of the invention are: to provide a cooking device for the purpose above indicated which will shape the cereal part of the edible in a more desirable two-part manner, so that after being cooked with the wiener or sausage in a nested relation thereto, the two-parts of the cereal jacket will be better adapted to have a dressing or sauce spread upon them, and may thereupon be folded upon each other without any portion of the sauce dripping off from them. Another object of the invention is to provide for more effectively heating and searing the two halves of a split wiener while the same is in a nested relation to the cereal part of the edible during the cooking thereof.

Other objects, advantages and features of invention will hereinafter appear.

Referring to the accompanying drawing, which illustrates what is at present deemed to be a preferred embodiment of the invention, Fig. 1 is a perspective view of the cooker shown in its closed position.

Fig. 2 is a top plan view of the cooker shown with its cover swung up to the fully open position, the meat portions of the edible being cooked being outlined by broken lines.

Fig. 3 is a vertical cross section taken on the plane indicated by the line 3—3 on Fig. 2.

Fig. 4 is a perspective view of the edible showing the same separately from the cooker, said edible being shown in the form it assumes while being cooked.

Fig. 5 is a perspective view of the edible as a completed product.

Referring in detail to the drawing:

The cooker shown comprises a box shaped base portion 7 supported by legs 8, its otherwise open top being shown covered by a removable two-part mold plate 9. The box portion 7 is, by preference and as shown, made of metal and is furnished with a lining 10 of asbestos or other insulating material, which is also a non-conductor of heat. Interiorly of said lining the box is provided with an electrically heating element 11 to which current is conducted by means of suitable conductors (not shown in detail), from the terminals 12.

Describing more in detail the mold or waffle plate 9, said plate is shown having a pair of trough forming, downwardly directed arcuate portions 14 which meet each other along the midwidth depressed portion 13 of the plate, the plate having a horizontal flange 15 along each side edge whereby it is supported upon the upper edge of the box portion 7. Said depression 13 terminates short of each end of the plate 9. Depending flanges 16 are provided at outer end edge portions of the plate 9 to keep it in place upon the box 7.

Transversely of each arcuate plate portion extends a series of fins 17 to conduct the heat into the cereal being cooked. These fins may in a general way be described as each being integral with the plate 9 and forming a fractional part of an annulus, each fin having an upwardly directed concave portion 18 which keeps the upper edge portion of the fin spaced away from that half 19 of the meat core during the time that the dough or batter is being cooked by reason of its contact with said fins.

In order to support the meat core portions 19 at the proper height the downwardly directed plate arches 14 are each provided with a plurality (three are shown in the drawing) of wiener supporting webs or plates 20. Each of these webs occupies nearly all the cross section of the trough shaped recess in the part of the plate 9 which it occupies, except that said web has centrally cut into its upper edge a semicircular recess 22 shaped to have fitted into it the convex side of a wiener, and has a downwardly inclined upper edge at each end to form the triangular recess 20x. Said recesses allow the batter to flow lengthwise of the trough as it is poured thereinto, thus making it unnecessary for the user to fill separately each space between adjacent wiener supporting webs 20, even though the wiener half has already been put in place.

The heating element 11 is shown housed and insulated in the chamber between the waffle plate 9 and the asbestos lining 10 to insure that the heat electrically produced by the heating element 11 will be conducted properly to the cooking plate 9 and from said plate will in turn be conducted to the edible cereal dough or batter occupying the spaces between the webs 20 and fins 17.

The device is shown furnished with a cover 25 which is hinged at 26 to a lateral extension 27 with which the box is provided. Said cover also contains an electric heating element 28 insulated by a lining 29 and underlying a narrow space 30 across which the heat passes to a flat metal plate 31, said plate 31 forming the inner wall of the cover 25. Current is furnished to the heating element 28 of the cover by means of the conductors 32 which are in circuit with the terminals 12 already mentioned. The cover is furnished with an operating handle 33.

The plate 31 of the cover may be fitted friction tight within, or otherwise secured to the marginal portion of the dish shaped cover body 25. Said plate 31 is so positioned that when the cover is in the fully closed position this plate is brought into a contacting relation to the flat faces of the wiener halves 19 and to the upper surface of the dough or batter within the waffle iron plate 9, provided that the trough portions of said plate have been completely filled with the batter. Hence, it follows that, when the cover is fully closed and the electric current turned on, there not only will be an efficient cooking of the batter or dough, but also the flat surfaces of the two halves of the wiener will be effectively seared thoroughly warming through the wieners while the batter is being cooked. A groove 35 around the twin trough portions receives any overflowing grease or batter.

The waffle plate 9, which forms the twin trough structure that has been described, is made removable in order that, if desired, a flat plate may be substituted for it and used to cook pancakes or to fry bacon, eggs, etc., either with or without the cooperation of the cover plate 31.

After the cooking of the batter and searing of the wiener halves has taken place, the two part cooked article is removed from the box 7, any suitable pointed instrument being used to do this, said article then having the appearance shown in Fig. 4. Thereupon one half of the semicircularly shaped article is folded over upon the other half thereof to form the approximately cylindrical completed product shown in Fig. 5.

As a brief résumé of the invention in its method aspect, it may be said that the formation of the completed product consists of the following steps:

First, the terminals 12 of the device are plugged into any suitable electric connection and electric current is thus supplied to the heating plates or elements 11 and 28. After the current has remained on for a sufficient length of time to heat the trough shaped sections of the plate 9 and also the face plate 31 of the cover portion of the device to a temperature which will produce quick cooking, a wiener is split longitudinally into halves and each half thereof placed upon the webs 20 in the position shown in Fig. 3 and indicated in the lower portion of Fig. 2 by broken lines. Thereupon the space below and at each side of each wiener half in the trough which it occupies is filled with a batter made from the cereal of which the jacket portion of the article is to be composed, said batter completely filling each trough and also occupying the depression 13 along the mid-width of the plate. This results in an isthmus or connecting web 35 being formed between the two halves of the edible as shown in Fig. 4. The cover is now swung to a fully closed position thus bringing its heated metal plate 31 into contact with the flat sides of the two wiener sections as well as in contact with the upper surface of the batter. After the cover has been maintained in its closed position for a sufficient length of time to complete the baking, then the cooked article is, as already has been stated, removed in the form shown in Fig. 4 and then folded upon itself to form the complete product shown in Fig. 5. For clearness of illustration, the wiener halves are cross sectioned in Figs. 3 and 4.

An advantage of the connecting web 35 is that, in case it is desired to apply a coating of sauce to the edible before folding the two halves together, this web prevents the sauce from spilling out during or after the folding over operation.

If desired, other food articles, for example split bananas, may be substituted for the wiener parts to form the core portion of the cooked article. Or metal core members may be used and be removed after the cooking to leave recesses that can be used to contain any desired kind of edible filling.

It should be understood that the present disclosure is for the purpose of illustration only and that this invention includes all modifications and equivalents which fall within the scope of the subject matter claimed.

What is claimed is:

1. In combination, a base provided with a trough substantially semicylindrical in cross section, said trough containing transverse webs in its lower portion, said webs each having a central arcuate recess to receive and support a split wiener, with its flat face on a level with the top of the trough, a cover hinged to said base and having a flat face portion to engage the flat face of the split wiener supported by said webs and to simultaneously engage edible material filling said trough, and self contained means to supply a cooking heat both to said cover and to the trough portion of said base.

2. The subject matter of claim 1, and, the end portions of said webs having their upper edges depressed to allow the batter when being supplied to flow over them lengthwise of the trough.

3. A cooker for an edible article including twin trough portions in a juxtaposed parallel relation to each other, there being a depression between said trough portions which, when said troughs are filled with a semi-liquid substance, is occupied by said substance and forms therein an isthmus uniting the two bodies of said substance to each other, a plurality of internal fins extending transversely of each of said troughs in a heat conductive relation thereto, the upper edge portions of said fins being in a downwardly spaced relation to the plane occupied by the top of said troughs, and a plurality of heat conductive webs also located within and extending transversely of each of said troughs, said webs each having an upper edge portion concaved to fit the convex side of a split wiener with its flat face on a level with the top of the trough, thus maintaining a clearance between the convex surface of such wiener and the upper edges of said fins to be occupied by the edible substance; a cover plate having a flat inner face contactable simultaneously with both the flat sides of said split wieners and with an edible substance filling said trough alongside of them, and means for supplying a cooking heat both to said cover and trough portions to cook both said split wieners and to an edible semi-liquid substance filling into said trough beside them.

4. The subject matter of claim 3 and, the concave portions of the webs of each trough being parallel to and equidistant from the depressed central portion of the cooker to provide for folding the two halves of the cooked edible together with the flat sides of the half wieners in a matched contacting relation to each other.

CLYDE W. VAUGHAN.